US008755332B2

(12) United States Patent
Miki

(10) Patent No.: US 8,755,332 B2
(45) Date of Patent: Jun. 17, 2014

(54) RADIO COMMUNICATION CONTROL METHOD, BASE STATION APPARATUS AND MOBILE TERMINAL APPARATUS

(75) Inventor: Nobuhiko Miki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 232 days.

(21) Appl. No.: 13/504,135

(22) PCT Filed: Oct. 21, 2010

(86) PCT No.: PCT/JP2010/068591
§ 371 (c)(1),
(2), (4) Date: May 18, 2012

(87) PCT Pub. No.: WO2011/052476
PCT Pub. Date: May 5, 2011

(65) Prior Publication Data
US 2012/0230258 A1 Sep. 13, 2012

(30) Foreign Application Priority Data
Nov. 2, 2009 (JP) ................................. 2009-252405

(51) Int. Cl.
H04W 4/00 (2009.01)
H04J 11/00 (2006.01)
H04L 5/00 (2006.01)
H04W 72/04 (2009.01)

(52) U.S. Cl.
CPC ............... *H04J 11/003* (2013.01); *H04L 5/001* (2013.01); *H04L 5/0094* (2013.01); *H04L 5/0053* (2013.01); *H04W 72/042* (2013.01)
USPC .......................................................... 370/328

(58) Field of Classification Search
CPC ............................... H04J 11/003; H04L 5/001
USPC .......................................................... 370/328
See application file for complete search history.

(56) References Cited

PUBLICATIONS

International Search Report w/translation from PCT/JP2010/068591 dated Dec. 21, 2010 (2 pages).
3GPP TSG RAN WG1 Meeting #58bis, R1-094237; "Views on Solution to PCFICH Detection Error"; NTT DoCoMo; Miyazaki, Japan; Oct. 12-16, 2009 (5 pages).
3GPP TSG RAN WG1 Meeting #59bis, R1-100492; "PCFICH for Cross-Carrier Assignment"; NTT DoCoMo; Valencia, Spain; Jan. 18-22, 2010 (3 pages).
3GPP TSG RAN WG Meeting #47bis, R1-070103; "Downlink L1/L2 Control Signaling Channel Structure: Coding"; NTT DoCoMo et al.; Sorrento, Italy; Jan. 15-19, 2007 (17 pages).
3GPP TS 36.211 V0.2.1; "3rd Generation Partnership Project; Technical Specification Group Radio Access Network; Physical Channels and Modulation (Release 8)"; Nov. 2006 (24 pages).
Notification of Reasons for Rejection in corresponding Japanese application No. 2009-252405 dated Jun. 25, 2013 (3 pages).

*Primary Examiner* — Xavier Szewai Wong
*Assistant Examiner* — Fangyan Deng
(74) *Attorney, Agent, or Firm* — Osha Liang LLP

(57) ABSTRACT

When time resource data that is assigned to a downlink control channel signal is reported on the downlink, the present invention improves the reliability of the time resource data that is reported, and prevent purposeless repetitions of retransmission requests. A base station apparatus (20) is provided herein, which jointly codes a carrier indicator of a basic frequency block with time resource data assigned to a downlink control channel signal corresponding to a downlink shared channel signal, generates a downlink control channel signal including the coded carrier indicator as the downlink control channel signal corresponding to the downlink shared channel signal, and transmits the generated downlink control channel signal by the basic frequency block assigned to the downlink control channel signal.

8 Claims, 20 Drawing Sheets (A)

(B)

CC SHIFT

| | NUMBER OF DL COMPONENT CARRIER SETS | | | |
|---|---|---|---|---|
| | 2 | 3 | 4 | 5 |
| 000 | 0 | 0 | 0 | 0 |
| 001 | +1 | +1 | +1 | +1 |
| 010 | | −1 | −1 | −1 |
| 011 | | N/A | +2 | +2 |
| 100 | | | | −2 |
| 101 | | | | N/A |
| 110 | | | | N/A |
| 111 | | | | N/A |
| NUMBER OF BITS | 1 BIT | 2 BITS | 2 BITS | 3 BITS |

FIG.6

(x, y)=(CC SHIFT, CFI VALUE)

| | NUMBER OF DL COMPONENT CARRIER SETS | | | |
|---|---|---|---|---|
| | 2 | 3 | 4 | 5 |
| 000 | (0, 1/2/3) | (0, 1/2/3) | (0, 1/2/3) | (0, 1/2/3) |
| 001 | (+1, 1) | (+1, 1) | (+1, 1) | (+1, 1) |
| 010 | (+1, 2) | (+1, 2) | (+1, 2) | (+1, 2) |
| 011 | (+1, 3) | (+1, 3) | (+1, 3) | (+1, 3) |
| 100 | | (−1, 1) | (−1, 1) | (−1, 1) |
| 101 | | (−1, 2) | (−1, 2) | (−1, 2) |
| 110 | | (−1, 3) | (−1, 3) | (−1, 3) |
| 111 | | N/A | (+2, 1) | (+2, 1) |
| 1000 | | | (+2, 2) | (+2, 2) |
| 1001 | | | (+2, 3) | (+2, 3) |
| 1010 | | | N/A | (−2, 1) |
| 1011 | | | N/A | (−2, 2) |
| 1100 | | | N/A | (−2, 3) |
| 1101 | | | N/A | N/A |
| 1110 | | | N/A | N/A |
| 1111 | | | N/A | N/A |
| NUMBER OF BITS | 2 BITS (+1 BIT) | 3 BITS (+1 BIT) | 4 BITS (+2 BITS) | 4 BITS (+1 BIT) |

FIG.8

(x, y)=(CC SHIFT, CFI VALUE)

| | NUMBER OF DL COMPONENT CARRIER SETS | | | |
|---|---|---|---|---|
| | 2 | 3 | 4 | 5 |
| 000 | (0, 1/2/3) | (0, 1/2/3) | (0, 1/2/3) | (0, 1/2/3) |
| 001 | (+1, 1) | (+1, 1) | (+1, 1) | (+1, 1/3) |
| 010 | (+1, 2) | (+1, 2) | (+1, 2) | (+1, 2) |
| 011 | (+1, 3) | (+1, 3) | (+1, 3) | (−1, 1/3) |
| 100 | N/A | (−1, 1) | (−1, 1) | (−1, 2) |
| 101 | N/A | (−1, 2) | (−1, 2) | (+2, 1/3) |
| 110 | N/A | (−1, 3) | (−1, 3) | (+2, 2) |
| 111 | N/A | N/A | (+2, 1/2/3) | (−2, 1/2/3) |
| NUMBER OF BITS | FIXED NUMBER OF BITS (3 BITS) | | | |

FIG.9

WHEN CC SHIFT=0 AND CFI IS NOT TRANSMITTED

|  | NUMBER OF DL COMPONENT CARRIER SETS | | | |
|---|---|---|---|---|
|  | 2 | 3 | 4 | 5 |
| 0000 | (0, 1/2/3) | (0, 1/2/3) | (0, 1/2/3) | (0, 1/2/3) |
| 0001 | (+1, 1) | (+1, 1) | (+1, 1) | (+1, 1) |
| 0010 | (+1, 2) | (+1, 2) | (+1, 2) | (+1, 2) |
| 0011 | (+1, 3) | (+1, 3) | (+1, 3) | (+1, 3) |
| 0100 | (−1, 1) | (−1, 1) | (−1, 1) | (−1, 1) |
| 0101 | (−1, 2) | (−1, 2) | (−1, 2) | (−1, 2) |
| 0110 | (−1, 3) | (−1, 3) | (−1, 3) | (−1, 3) |
| 0111 | (+2, 1) | (+2, 1) | (+2, 1) | (+2, 1) |
| 1000 | (+2, 2) | (+2, 2) | (+2, 2) | (+2, 2) |
| 1001 | (+2, 3) | (+2, 3) | (+2, 3) | (+2, 3) |
| 1010 | (−2, 1) | (−2, 1) | (−2, 1) | (−2, 1) |
| 1011 | (−2, 2) | (−2, 2) | (−2, 2) | (−2, 2) |
| 1100 | (−2, 3) | (−2, 3) | (−2, 3) | (−2, 3) |
| 1101 | N/A | N/A | N/A | N/A |
| 1110 | N/A | N/A | N/A | N/A |
| 1111 | N/A | N/A | N/A | N/A |

FIG.18

WHEN CC SHIFT=0 AND CFI IS TRANSMITTED

| | NUMBER OF DL COMPONENT CARRIER SETS | | | |
|---|---|---|---|---|
| | 2 | 3 | 4 | 5 |
| 0000 | (0, 1) | (0, 1) | (0, 1) | (0, 1) |
| 0001 | (0, 2) | (0, 2) | (0, 2) | (0, 2) |
| 0010 | (0, 3) | (0, 3) | (0, 3) | (0, 3) |
| 0011 | (+1, 1) | (+1, 1) | (+1, 1) | (+1, 1) |
| 0100 | (+1, 2) | (+1, 2) | (+1, 2) | (+1, 2) |
| 0101 | (+1, 3) | (+1, 3) | (+1, 3) | (+1, 3) |
| 0110 | (−1, 1) | (−1, 1) | (−1, 1) | (−1, 1) |
| 0111 | (−1, 2) | (−1, 2) | (−1, 2) | (−1, 2) |
| 1000 | (−1, 3) | (−1, 3) | (−1, 3) | (−1, 3) |
| 1001 | (+2, 1) | (+2, 1) | (+2, 1) | (+2, 1) |
| 1010 | (+2, 2) | (+2, 2) | (+2, 2) | (+2, 2) |
| 1011 | (+2, 3) | (+2, 3) | (+2, 3) | (+2, 3) |
| 1100 | (−2, 1) | (−2, 1) | (−2, 1) | (−2, 1) |
| 1101 | (−2, 2) | (−2, 2) | (−2, 2) | (−2, 2) |
| 1110 | (−2, 3) | (−2, 3) | (−2, 3) | (−2, 3) |
| 1111 | N/A | N/A | N/A | N/A |

FIG.19

|  | NUMBER OF DL COMPONENT CARRIER SETS | | | |
|---|---|---|---|---|
|  | 2 | 3 | 4 | 5 |
| 000 | (0, 1) | (0, 2) | (0, 1/2/3) | (0, 1/2/3) |
| 001 | (0, 2) | (0, 3) | (+1, 1) | (+1, 1/3) |
| 010 | (0, 3) | (+1, 1) | (+1, 2) | (+1, 2) |
| 011 | (+1, 1) | (+1, 2) | (+1, 3) | (−1, 1/3) |
| 100 | (+1, 2) | (+1, 3) | (−1, 1) | (−1, 2) |
| 101 | (+1, 3) | (−1, 1) | (−1, 2) | (+2, 1/3) |
| 110 | N/A | (−1, 2) | (−1, 3) | (+2, 2) |
| 111 | N/A | (−1, 3) | (+2, 1/2/3) | (−2, 1/2/3) |

FIG.20

|  | NUMBER OF DL COMPONENT CARRIER SETS | | | |
|---|---|---|---|---|
|  | 2 | 3 | 4 | 5 |
| 00 | (0, 1/2/3) | (0, 1/2/3) | (0, 1/2/3) | (0, 1/2/3) |
| 01 | (+1, 1) | (+1, 1/3) | (+1, 1/2/3) | (+1, 1/2/3) |
| 10 | (+1, 2) | (+1, 2) | (−1, 1/2/3) | (−1, 1/2/3) |
| 11 | (+1, 3) | (−1, 1/2/3) | (+2, 1/2/3) | (+2, 1/2/3) |

FIG.21

RADIO COMMUNICATION CONTROL METHOD, BASE STATION APPARATUS AND MOBILE TERMINAL APPARATUS

TECHNICAL FIELD

The present invention relates to, in a system band divided into a plurality of basic frequency blocks (hereinafter referred to as "component carriers"), a radio communication control method for transmitting signals using a plurality of component carriers. More particularly, the present invention relates to a base station apparatus that generates downlink signals, and a mobile terminal apparatus that receives downlink signals from the base station apparatus.

BACKGROUND ART

The communication scheme subsequent to W-CDMA (Wideband Code Division Multiple Access) and HSDPA (High Speed Downlink Packet Access), that is, long-term evolution (LTE), has been set forth by 3GPP, which is the standards organization of W-CDMA, and, for radio access schemes, OFDMA (Orthogonal Frequency Division Multiple Access) has been employed on the downlink and SC-FDMA (Single-Carrier Frequency Division Multiple Access) has been employed on the uplink.

OFDMA is a scheme to perform transmission by dividing a frequency band into a plurality of narrow frequency bands (subcarriers) and placing data on each frequency band, and, by arranging subcarriers on frequencies densely so as to partly overlap each other and yet not interfere with each other, it is possible to realize high-speed transmission and improve the efficiency of use of frequencies.

SC-FDMA is a transmission scheme that can reduce interference between terminals by dividing a frequency band and performing transmission using different frequency bands between a plurality of terminals. SC-FDMA has a characteristic of reducing the variation of transmission power, so that low power consumption of terminals and wide coverage are made possible.

LTE is a system in which communication is performed by sharing one or two or more physical channels between a plurality of mobile stations (UE: User Equipment) on both the uplink and the downlink. The above channels shared by a plurality of mobile stations UE are generally referred to as "shared channels," and, in LTE, these include the PUSCH (Physical Uplink Shared Channel) for the uplink and the PDSCH (Physical Downlink Shared Channel) for the downlink.

Then, in a communication system using the above-described shared channels, it is necessary to signal, per subframe which is a transmission time unit, to which mobile stations UE the above shared channels are assigned. A subframe may be referred to as a "transmission time interval" (TTI).

In LTE, the PDCCH (Physical Downlink Control Channel) is set forth as a downlink control channel to be used for the above signaling, and, furthermore, the PCFICH (Physical Control Format Indicator Channel) is set forth as a control channel to report the number of OFDM symbols used for the PDCCH, and the PHICH (Physical Hybrid-ARQ Indicator Channel) is set forth as a control channel to transmit hybrid ARQ ACK or NACK information for the PUSCH.

Downlink control information that is transmitted by the PDCCH includes, for example, downlink scheduling information, UL scheduling grant, overload indicator and transmission power control command bit (non-patent literature 1).

Also, the above downlink scheduling information includes, for example, downlink resource block assignment information, UE IDs, the number of streams, information related to precoding vectors, data size, modulation scheme, and information related to HARQ (Hybrid Automatic Repeat reQuest). Furthermore, the above uplink scheduling grant includes, for example, uplink resource block assignment information, UE IDs, data size, modulation scheme, uplink transmission power information, and demodulation reference signal information.

The above PCFICH is information to report the PDCCH format. To be more specific, by means of this PCFICH, the number of OFDM symbols to which the PDCCH is mapped, is reported as control channel format information (CFI). In LTE, the number of OFDM symbols to which the PDCCH is mapped is one of 1, 2 and 3, and, in one subframe, the PDCCH is mapped from the top OFDM symbol (non-patent literature 2).

On the downlink, a range corresponding to the number of OFDM symbols (CFI value) reported by the PCFICH from the beginning of a subframe, serves as a control channel region assigned to the PDCCH. A mobile station decodes the control channel region, and, if there is information addressed to that mobile station, further specifies and decodes the radio resources allocated to the PDSCH, based on downlink control information.

CITATION LIST

Non-Patent Literature

Non-Patent Literature 1: R1-070103, Downlink L1/L2 Control Signaling Channel Structure: Coding
Non-Patent Literature 2: 3GPP TR 36.211 (V0.2.1), "Physical Channels and Modulation," November 2006

SUMMARY OF INVENTION

Technical Problem

However, depending on the quality of radio resources allocated to the control channel region, a PCFICH error might occur. When there is an error with control channel region assignment information reported by the PCFICH, a problem of being unable to decode the PDSCH correctly and therefore repeating a retransmission request, occurs.

In view of the above, it is therefore an object of the present invention to provide a radio communication control method, a mobile terminal apparatus and a base station apparatus, whereby, when time resource data (the number of symbols represented by CFI) assigned to a downlink control channel signal is reported on the downlink, it is possible to improve the reliability of the time resource data that is reported, and prevent ineffective repetition of retransmission requests.

Solution to Problem

One aspect of the present invention has: a coding section configured to jointly code a carrier indicator of a basic frequency block assigned to a downlink shared channel signal and time resource data assigned to a downlink control channel signal corresponding to the downlink shared channel signal; a control channel signal generation section configured to generate a downlink control signal including the coded carrier indicator as the downlink control channel signal corresponding to the downlink shared channel signal; and a transmission section configured to transmit the generated downlink control channel signal by a basic frequency block assigned to the downlink control channel signal.

According to the present invention, a carrier indicator of a basic frequency block is jointly coded with time resource data assigned to a downlink control channel signal corresponding to a downlink shared channel signal and included in a downlink control channel signal, so that, even when the time resource data assigned to the downlink control channel signal is extended to be transmittable by a different basic frequency block from that of the downlink shared channel signal, it is still possible to minimize the increase of the number of bits.

Advantageous Effects of Invention

According to the present invention, when time resource data assigned to a downlink control channel signal is reported on the downlink, it is possible to improve the reliability of the time resource data that is reported, and prevent ineffective repetition of retransmission requests.

BRIEF DESCRIPTION OF DRAWINGS

FIG. 6 is a drawing illustrating a table associating the types of carrier indicators and the numbers of bits;

FIG. 8 is a configuration diagram of a joint coding table;

FIG. 9 is a configuration diagram of a joint coding table in which the number of bits of the carrier indicator field is fixed;

FIG. 18 is a configuration diagram of a table fixed with four bits, in which the CFI value can be reported in cases other than a case where the amount of shift is CC shift=0;

FIG. 19 is a configuration diagram of a table fixed with four bits, in which the CFI value can be reported even in a case where the amount of shift is CC shift=0;

FIG. 20 is a configuration diagram of a table fixed with three bits, in which the CFI value can be partly reported even in a case where the amount of shift is CC shift=0; and FIG. 21 is a configuration diagram of a table fixed with two bits.

DESCRIPTION OF EMBODIMENTS

The present invention is designed such that, in a communication system where, to a mobile station UE, a base station eNB transmits a downlink shared channel signal and a downlink control channel signal corresponding to that downlink shared channel signal, and reports time resource data (CFI value represented by the number of symbols) representing the time resources allocated to the downlink control channel signal, and where, in the mobile station UE, the downlink shared channel is decoded from a starting position based on the CFI value, the time resource data assigned to the downlink control channel signal is combined with a carrier indicator representing the component carrier assigned to the downlink shared channel signal and joint-coded, and the carrier indicator having been subjected to joint coding is reported through the downlink.

Figure 1:
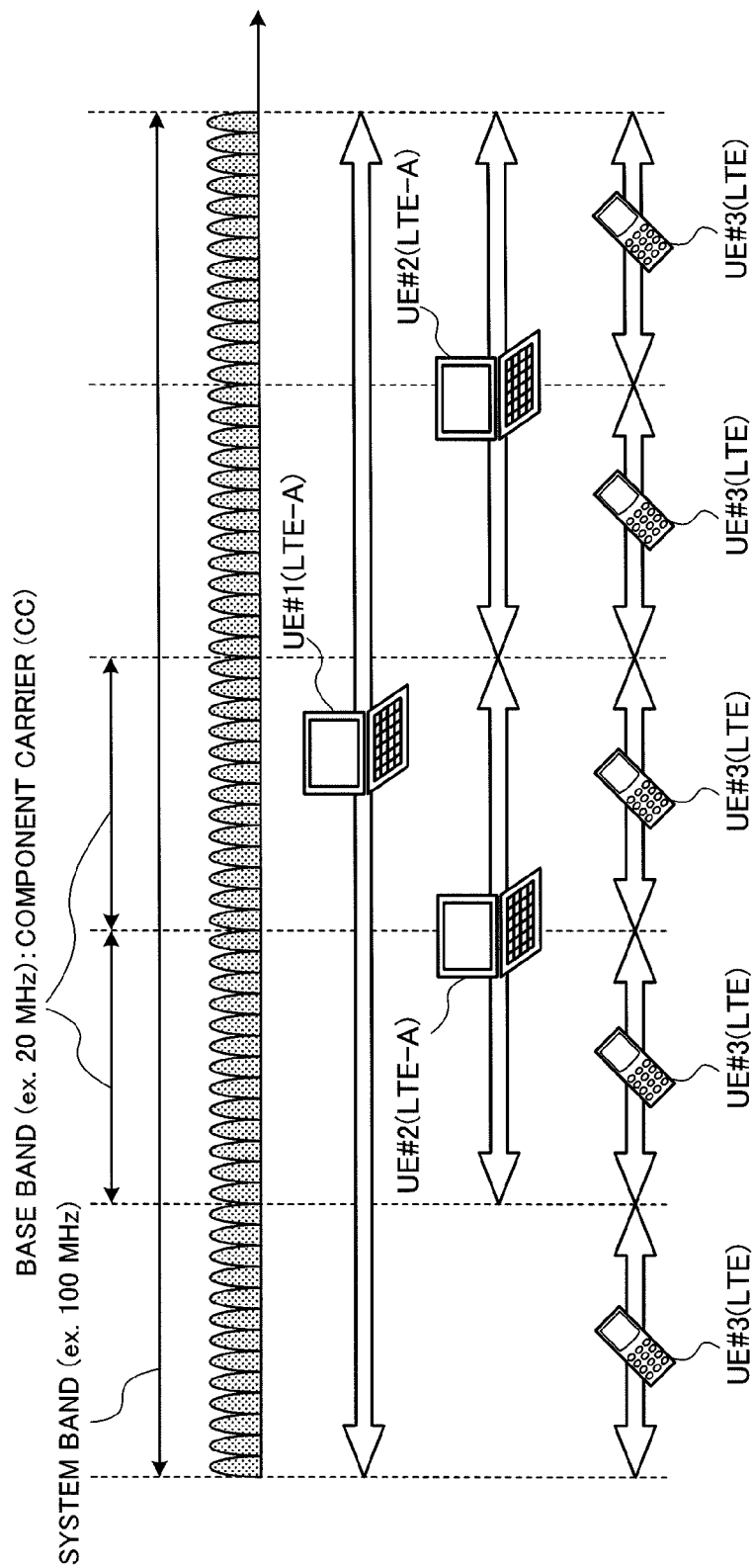
FIG. 1 is a drawing illustrating a layered bandwidth configuration as defined in LTE-A.

Hereinafter a communication system in which carrier indicators and CFI values are subject to joint coding will be described in detail. FIG. 1 is a drawing illustrating a layered bandwidth configuration as defined in LTE-A. The example illustrated in FIG. 1 is a layered bandwidth configuration in the event where an LTE-A system, which is the first mobile communication system having the first system band formed with a plurality of basic frequency blocks, and an LTE system, which is a second mobile communication system having a second system band formed with one basic frequency block, are both present. In the LTE-A system, for example, radio communication is performed in a variable system bandwidth of 100 MHz or lower, and, in the LTE system, radio communication is performed in a variable system bandwidth of 20 MHz or lower. The system band for the LTE-A system is at least one basic frequency block, where the system band of the LTE system is one unit. In LTE-A, a basic frequency block is referred to as a "component carrier." Aggregating a plurality of basic frequency blocks into a wide band in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile station UE (User Equipment) #1 is a mobile station to support the LTE-A system (and also support the LTE system) and can support a system band up to 100 MHz. UE #2 is a mobile station to support the LTE-A system (and also support the LTE system) and can support a system band up to 40 MHz (20 MHz×2=40 MHz). UE #3 is a mobile station to support the LTE system (and not support the LTE-A system) and can support a system band up to 20 MHz (base band).

Figure 2:
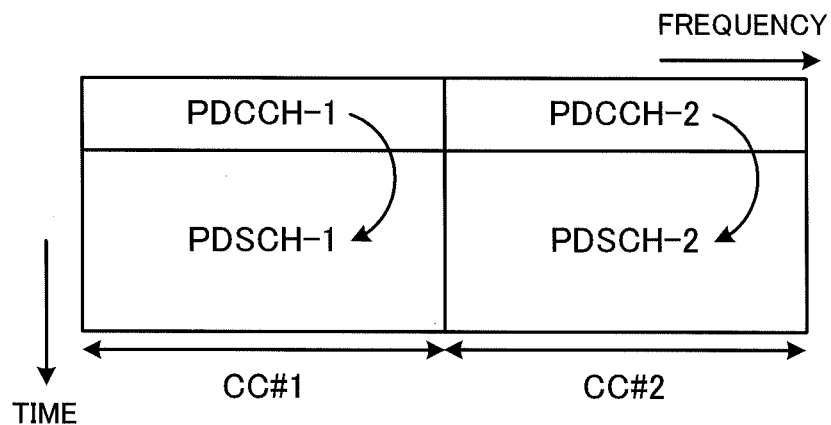
FIG. 2 provides conceptual diagrams illustrating methods of transmitting downlink control channels.
Figure 2:
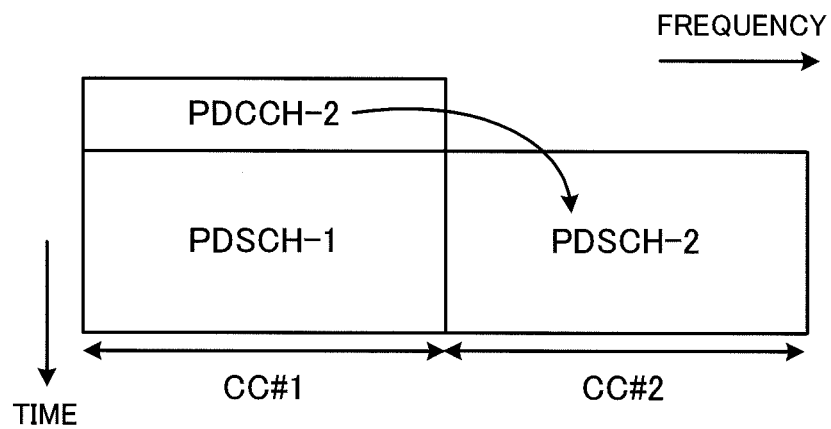

In radio communication in a system band widened in this way, for the method of transmitting a downlink control channel to report information necessary for traffic channels (PDSCH reception and PUSCH transmission), the two methods illustrated in FIGS. 2(A) and (B) are possible. With the method illustrated in FIG. 2(A), a PDSCH and a PDCCH corresponding to that PDSCH, are transmitted by the same component carrier. To be more specific, PDSCH-1 is assigned to component carrier CC #1 and PDSCH-2 is assigned to different component carrier CC #2. PDCCH-1, which includes control information for decoding PDSCH-1, is transmitted by same component carrier CC #1 as for PDSCH-1, and PDCCH-2, which includes control information for decoding PDSCH-2, is transmitted by same component carrier CC #2 as for PDSCH-2. A user terminal decodes the PDCCHs, acquires the control information of the PDSCHs, and decodes the PDSCHs based on that control information.

With the method illustrated in FIG. 2(B), PDSCHs and a PDCCH corresponding to those PDSCHs are transmitted by different component carriers. To be more specific, similar to FIG. 2(A), although PDSCH-1 is assigned to component carrier CC #1 and PDSCH-2 is assigned to different component carrier CC #2, the method of reporting PDCCH-2, which is control information for decoding PDSCH-2, is different from the method of FIG. 2(A). That is to say, PDCCH-2 is transmitted by component carrier CC #1, which is different from the component carrier by which PDSCH-2 to require control information of PDCCH-2 is transmitted.

The present inventors have noted the point that, in an LTE-A system where the system band is widened by means of carrier aggregation, when PDCCH-2 is assigned to component carrier CC #1, which is different from original component carrier CC #2 that is assigned to PDSCH-2 to be decoded using control information of that PDCCH-2 (FIG. 2(B)), even if PDCCH-2 is decoded without error, PDSCH-2 transmitted by the original component carrier (CC #2) may not be decoded correctly.

This will be described below in detail. In an LTE/LTE-A system, information to transmit as a downlink physical control signal can include control channel format information (CFI: Control channel Format Indicator), ACK/NACK information for uplink shared channel (PUSCH) transmission data, and resource allocation information (DCI: Downlink Control Information) for uplink/downlink shared channels. DCI mainly includes radio resource allocation information but can also include control information about other things than radio resources, such as transmission power control commands. Consequently, DCI may be referred to as "downlink control information." Downlink control channel signals are transmitted by the PCFICH (Physical Control Format Indicator Channel), PHICH (Physical Hybrid ARQ Indicator Channel) and PDCCH. These control signals are reported by the beginning n OFDM symbols in the first slot, in each subframe, in a way to time-multiplex with the PDSCH. A subframe is the transmission time unit upon user data transmission.

Figure 3:
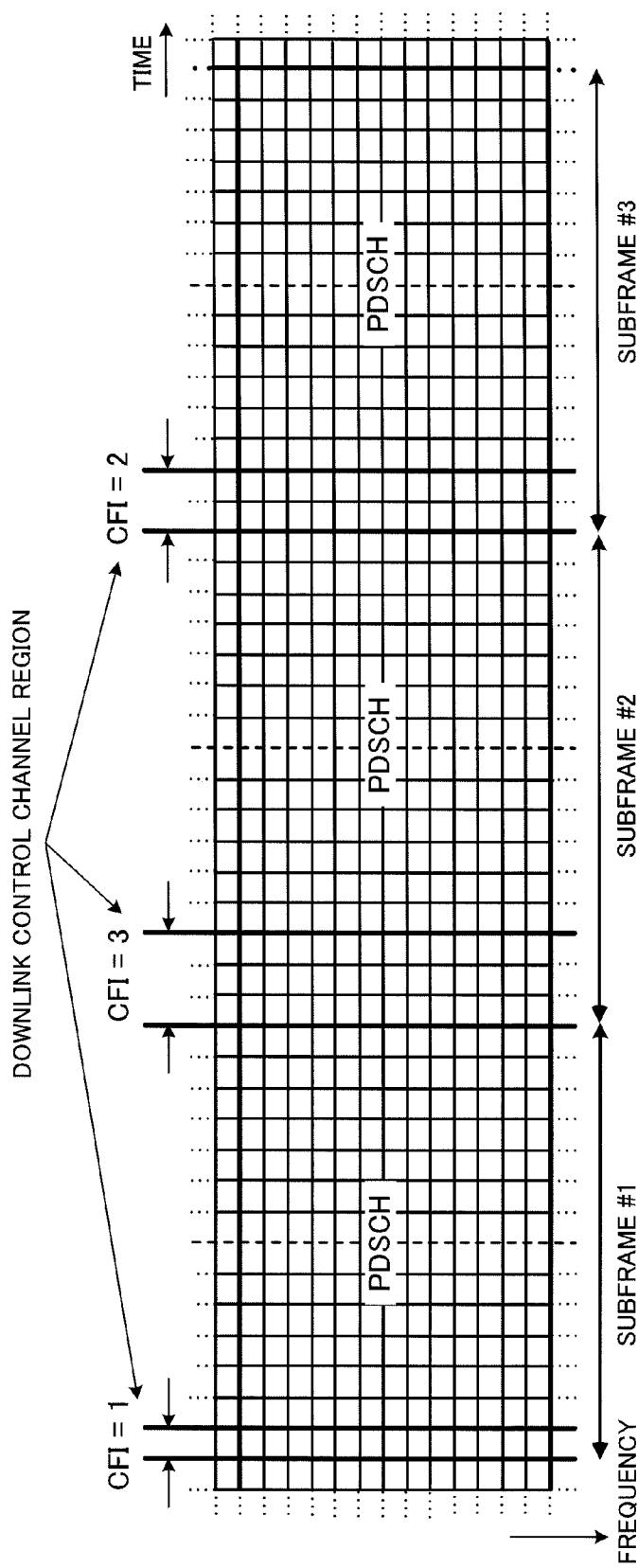
FIG. 3 is a drawing illustrating the relationship between control channel regions and data regions in subframes.

The PCFICH reports the number of OFDM symbols (n), to which the PDCCH is assigned, in one OFDM symbol, by two-bit CFI values. In regions designated by the CFI values, signals of the PCFICH, PHICH, and PDCCH are arranged. A region designated by a CFI value in each subframe is referred to as a control channel region, and a region in each subframe where the PDSCH signal (which is manly user data but can include part of control signals) is arranged is referred to as a data region. FIG. 3 illustrates an example of relationship between control channel regions and data regions. When CFI=1 is reported in subframe #1, a control channel region is multiplexed over the beginning one OFDM symbol in the first slot, and, from the second OFDM symbol onward in that subframe, a data region starts. That is to say, CFI values that are reported on a per subframe basis indicate the boundary between the control channel region and the data region in each subframe.

With the PDCCH reporting method illustrated in FIG. 2(B), if the PCFICH transmitted by the same component carrier (CC #2) as for PDSCH-2, the starting position of PDSCH-2 indicated by the CFI value reported by that PCFICH is wrong. As a result, the phenomenon where PDSCH-2 is not decoded correctly occurs. In particular, when PDCCH-2 transmitted using a component carrier that is different from the original component carrier (the component carrier used to transmit the PDSCH) is decoded without error, decoding failures and retransmission requests for PDSCH-2 are repeated, and these leads to significant deterioration of throughput. Here, in the event transmission is performed using PDCCH-2, the arrangement of PDCCH-2 varies depending on CFI values, so that there is a little likelihood that PDCCH-2 is decoded correctly. Consequently, this phenomenon occurs when the component carriers to transmit the PDCCH and the PDSCH are different.

So, a method is proposed herein, whereby, when PDSCH-2 and PDCCH-2 are transmitted by different component carriers (for example, as in the case illustrated in FIG. 2(B)), the CFI value related to PDCCH-2 is included and transmitted in PDCCH-1 that is transmitted by a component carrier (CC #1), in parallel with or instead of the PCFICH that is transmitted by a component carrier (CC #2).

Here, a case is assumed where, although a PDSCH is transmitted by a original component carrier, a PDCCH to report control information for decoding that PDSCH is transmitted by a different component carrier. In this case, the PDCCH is transmitted by a component carrier that is different from the original component carrier. Consequently, in the receiver, it is necessary to decide that a PDCCH decoded from control channel regions of a plurality of component carriers is control information for the PDSCH transmitted by which component carrier. As one measure for this, a mechanism to expressly indicate the original component carrier of a PDCCH by a carrier indicator has been proposed.

Figure 4:
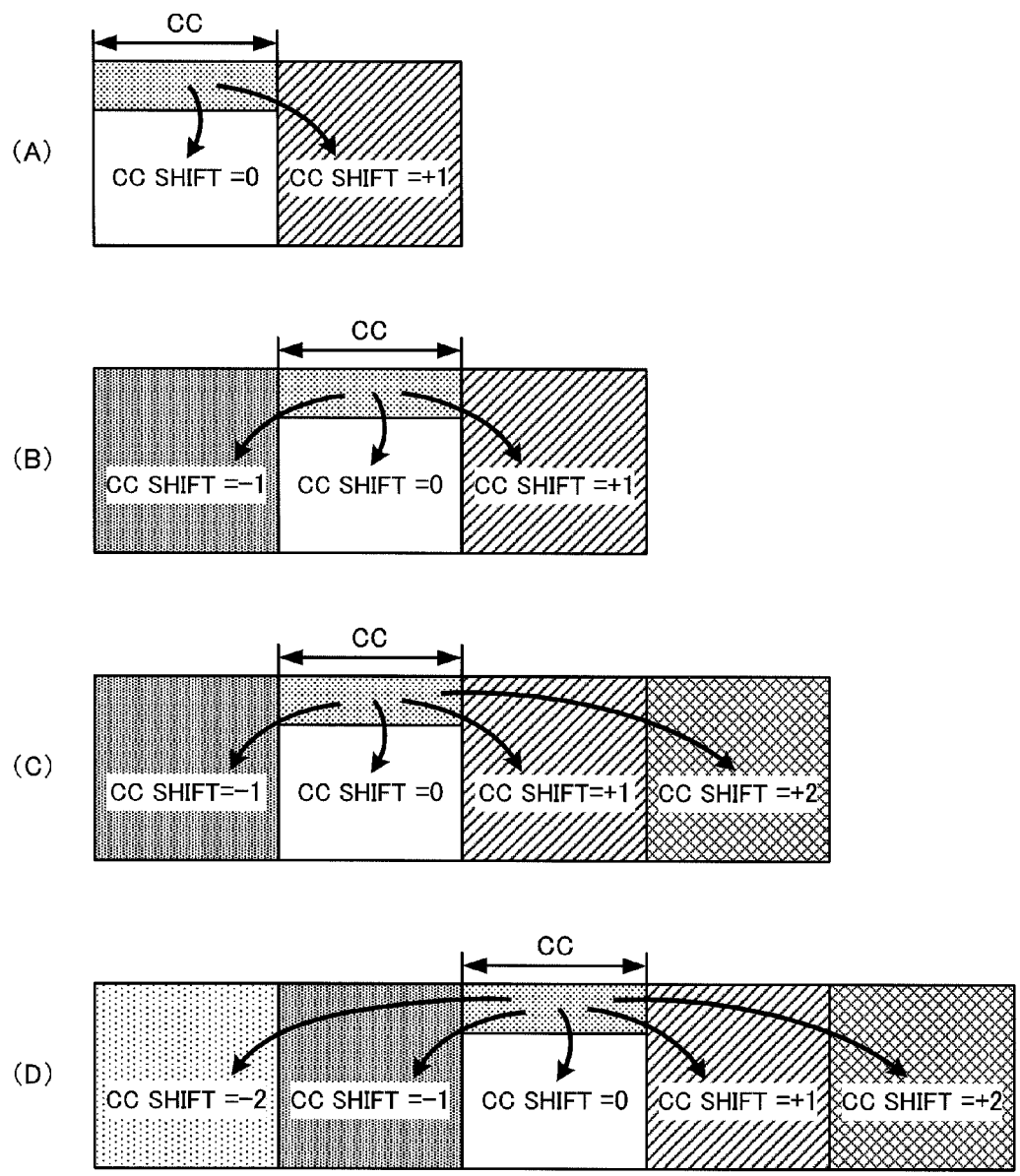
FIG. 4 provides drawings for explaining the relationship between component carriers and carrier indicators.
Figure 5:
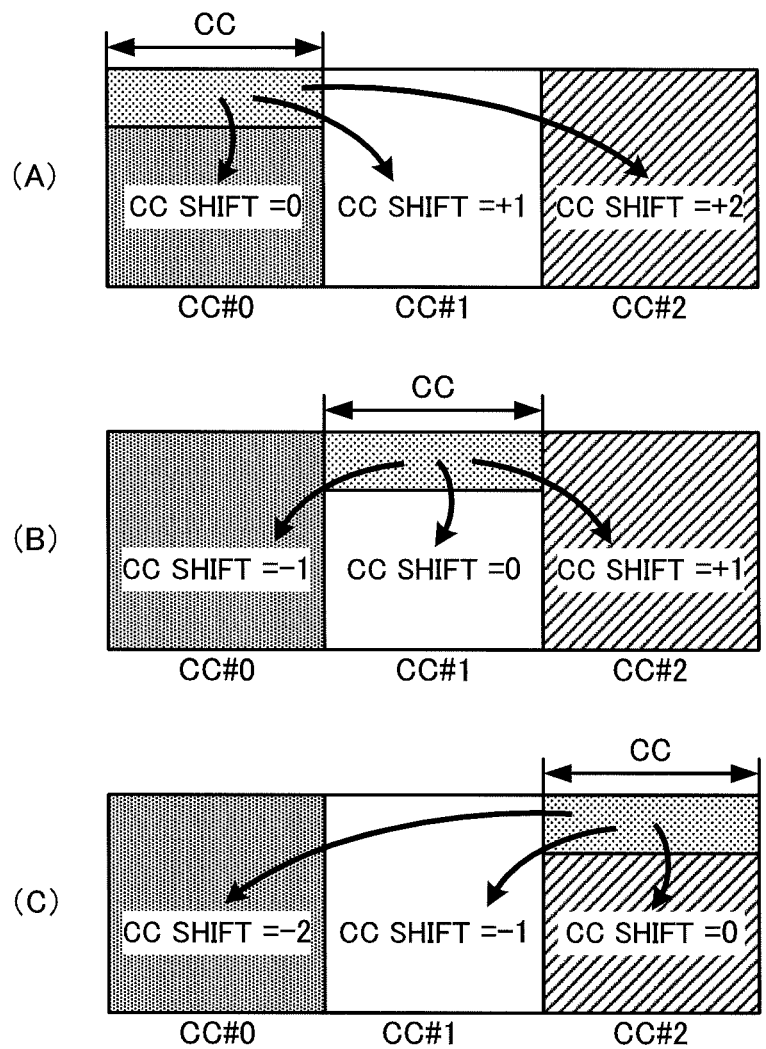
FIG. 5 provides drawings for explaining the relationship between component carriers transmitting the PDCCH and carrier indicators.

Referring to FIG. 4 and FIG. 5, the definition of carrier indicators and the number of bits required to transmit carrier indicators will be described. FIG. 4 illustrates examples of defining a carrier, indicator by the amount of component carrier shift (CC shift).

As illustrated in FIG. 4(A), when a PDSCH and a PDCCH corresponding to that PDSCH are transmitted by the same component carrier, the amount of component carrier shift is defined as CC shift=0, and, when a PDCCH is transmitted by a component carrier that is one cc shifted from the original component carrier (the component carrier used to transmit the PDSCH corresponding to that PDCCH) in the frequency axis direction, the amount of component carrier shift is defined as CC shift=+1. Note that, when being shifted from the original component carrier in the first direction (the right direction in FIG. 4) in the frequency domain, the symbol "+" is assigned, and, on the other hand, when being shifted from the original component carrier in the second direction (the left direction in FIG. 4) in the frequency domain, the symbol "−" is assigned. As for the amount of shift between two component carriers, the amount of component carrier shift can be represented as CC shift=0 or +1 and can therefore be represented by one bit.

As illustrated in FIG. 4(B), when a PDCCH is one cc shifted from the original component carrier in the second direction, CC shift=−1 is defined. As for the amount of shift among three component carriers, the amount of component carrier shift can be represented as CC shift=0, +1 and −1, and can therefore be represented by two bits.

As illustrated in FIG. 4(C), when a PDCCH is maximum two CCs shifted from the original component carrier in the first direction, the amount of component carrier shift is defined as CC shift=+2. As for the amount of shift among four component carriers, the amount of component carrier shift can be represented as CC shift=0, +1, −1 and +2, and can therefore be represented by two bits.

As illustrated in FIG. 4(D), when a PDCCH is maximum two CCs shifted from the original component carrier in the second direction, the amount of component carrier shift is defined as CC shift=−2. As for the amount of shift among five component carriers, the amount of component carrier shift can be represented as CC shift=0, +1, −1, +2 and −2, and can therefore be represented by three bits.

To support maximum five component carriers, it is necessary to prepare, for the carrier indicator, a bit width (three bits) allowing the carrier indicator to set five types of CC shift=0, +1, −1, +2 and −2.

Although in the example illustrated in FIG. 4(B), a PDCCH is transmitted by the component carrier arranged in the center of three component carriers, the present invention is by no means limited to cases like this. As illustrated in FIG. 5(A), assuming that the component carrier to transmit the PDCCH is CC #0 at the left end, the CC shift is (0, +1, +2); as illustrated in FIG. 5(B), if the component carrier to transmit the PDCCH is CC #1 in the center, the CC shift is (0, +1, −1); and, as illustrated in FIG. 5(C), if the component carrier to transmit the PDCCH is CC #2 at the right end, the CC shift is (0, −2, −1). In this way, when there are three component carrier sets, there are three variations of CC shift, namely (0, +1, +2), (0, +1, −1) and (0, −2, −1). However, if the component carrier configuration is cyclic (meaning that CC #3 is CC #0 and CC # (−1) is CC #2), (0, +1, −1) alone is sufficient, as described above. A case will be described below as an example where the CC shift is (0, +1, −1).

FIG. 6 illustrates a table associating the types of carrier indicators (that is, shift amounts) required for corresponding component carrier sets, and the numbers of bits required to represent all carrier indicators. For example, in the event of component carrier set 3, two bits are sufficient, because only CC shift=0, +1, and −1 need to be represented. On the other hand, in the event of component carrier set 5, three bits are required to represent five types of CC shift=0, +1, −1, +2, and −2.

One aspect of the present invention has a characteristic of including a carrier indicator in a DCI that is reported by a PDCCH and of joint-coding that carrier indicator and the CFI value.

Figure 7:
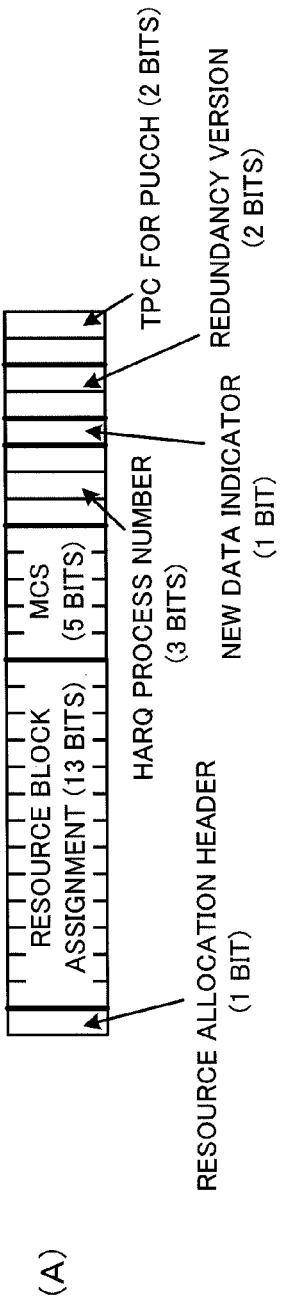
FIG. 7 provides drawings illustrating a DCI field configuration.
Figure 7:
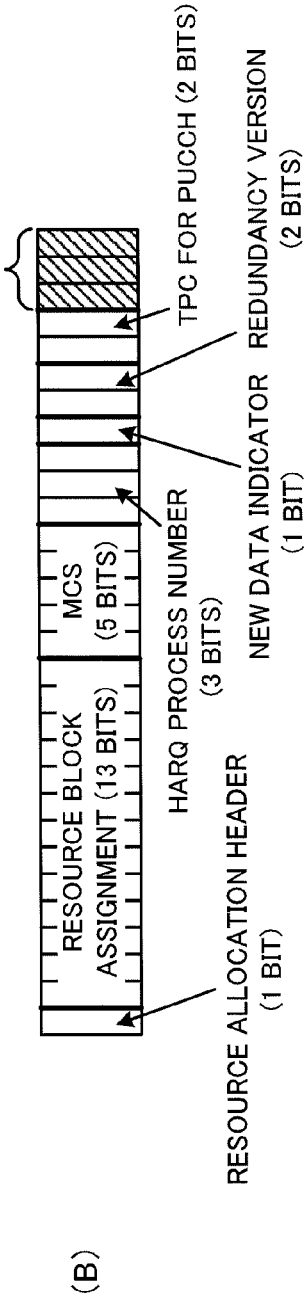

FIGS. 7(A) and (B) illustrate DCI field configurations. FIG. 7(A) illustrates a DCI configuration as defined by the LTE system (release-8). The DCI configuration defined in the LTE system (release-8) is configured with resource allocation information per terminal (resource block assignment), MCS information (Modulation and Coding Scheme) of assigned resource blocks or transport block information, information required when using hybrid ARQ, which is used to correct, with high efficiency and low delay, data reception errors occurred on the terminal side, or, to be more specific, a corresponding memory number used when combining initial transmission and retransmission packets, that is to say, HARQ process number, an identifier to distinguish between new data and retransmission data (new data indicator), information to represent which part of a coded sequence is transmitted (redundancy version), and a PUCCH transmission power control command (TPC for PUCCH).

In the DCI configuration illustrated in FIG. 7(B), in addition to the DCI field configuration defined in the LTE system (release-8), a carrier indicator field (CI) is provided. In the carrier indicator field (CI), from the component carrier assigned to the PDCCH, the amount of shift (CC shift) to the original component carrier assigned to the PDSCH corresponding to that PDCCH, is set. For the carrier indicator field (CI), as illustrated in FIG. 6, two bits are sufficient to support a system band up to four component carriers, and three bits are required to support a system band up to five component carriers. For example, if the carrier indicator field (CI) is two bits, four types of amounts of shift from (00) to (11) (CC shift=0, +1, −1 and +2) can be reported, and, if the carrier indicator field is three bits, eight types of amounts of shift from (000) to (111) can be reported.

One aspect of the present invention prepares a table to represent the combinations of a value which a carrier indicator can take (for example, 0, +1, −1, +2 or −2 with five CCs) and a value which a CFI value can take (for example, 1, 2 or 3), with a bit code of a predetermined bit width (joint coding table), and sets a bit number corresponding to the combination of a carrier indicator and a CFI value in a carrier indicator field (CI).

By this means, compared to a case of providing a dedicated field for a CFI value in the DCI configuration, it is possible to reduce the increase of the number of bits and transmit the CFI value with a PDCCH using a component carrier that is different from the original component carrier.

FIG. 8 illustrates a joint coding table of carrier indicators and CFI values. In this drawing, the maximum value of a component carrier set is 5 and a CFI value is one of 1, 2 and 3, and all combinations of component carriers and CFI values are subject to joint coding. Each combination of a carrier indicator and a CFI value is (x, y), where x indicates the carrier indicator (CC shift) and y indicates the CFI value. When the field width is made four bits, it is possible to transmit all the combinations illustrated in FIG. 8 properly. The DCI configuration illustrated in FIG. 7(B) is an example where the field width of the carrier indicator field is three bits.

Also, in the event the amount of shift is CC shift=0, because this is a case where a PDCCH is transmitted by the original component carrier, it is possible not to report the CFI value using a component carrier that is different from the original component carrier. Consequently, this is equivalent to not reporting the CFI value in the event of CC shift=0 in the joint coding table.

As illustrated in the lowermost column in FIG. 8, even if a carrier indicator and a CFI value (1, 2, 3) are combined and joint-encoded, only an addition of one bit (component carrier sets 2 and 3, 5) or two bits (component carrier set 4) is required, compared to a case of a carrier indicator alone. That is to say, it is possible to include the CFI value in the DCI structure in the PDCCH, without requiring a significant addition of bits which might result in increased data volume.

Also, in the joint coding of carrier indicators and CFI values illustrated in FIG. 8, the number of bits required for the carrier indicator field (CI) changes depending on component carrier sets. As with component carrier sets 2 and 3, three bits are sufficient to support these, while four bits are required for component carrier sets 4 and 5. As with component carrier sets 2 and 3, it is possible to perform joint coding with four bits.

Another aspect of the present invention fixes the number of bits of the carrier indicator field (CI), and, for component carriers other than desired part of component carriers, reports only the assignment, and uses the CFI value reported by the PCFICH when it is not possible to report the CFI value using the carrier indicator field. The CFI value may be reported preferentially in a case where the component carrier to transmit the PDCCH and the original component carrier are adjacent with each other (that is, the amount of shift is CC shift=+1, −1), or the CFI value may be reported preferentially in a case where the amount of shift is CC shift=+1, +2.

FIG. 9 illustrates a joint coding table of carrier indicators and CFI values when the number of bits of the carrier indicator field (CI) is fixed. The maximum value of a component carrier set is 5 and a CFI value is one of 1, 2 and 3, and a component carrier and a CFI value are subject to joint coding. The number of bits of the carrier indicator field (CI) is fixed to three.

In this drawing, the notation of "1/2/3" with respect to the CFI value (y) means that the CFI value is one of 1, 2 and 3. Given that the number of bits of the carrier indicator field (CI) is fixed to three, there are parts in component carrier sets 4 and 5 where the CFI value cannot be reported. In parts where the CFI value (y) is 1/3 and 1/2/3, it is not possible to report the CFI value.

In the event of component carrier set 2 or 3, all combinations of a carrier indicator and a CFI value can be represented by three bits. In the joint coding table illustrated in FIG. 9, in the event of component carrier set 4, only if the component carrier to transmit the PDCCH is two component carriers (CC shift=+2) apart from the original component carrier by which the PDSCH is transmitted, the CFI value is 1/2/3. That is to say, only when the amount of shift is CC shift=+2, it is not possible to report the CFI value, and, when other amounts of shift apply, it is possible to report the CFI value. In other words, up to the case where the original component carrier to transmit the PDSCH and the component carrier to transmit its PDCCH are adjacent with each other (CC shift=+1, −1), it is possible to report the CFI value.

Furthermore, in the event of component carrier set 5, if the amount of shift is CC shift=+1, −1, +2 and −2, it is possible to report only one of the CFI values 1, 2 and 3 (CFI=2 in FIG. 8). When the amount of shift is CC shift=+1, −1, +2, in the receiver, the CFI value that is joint-encoded with the carrier indicator and transmitted, and the CFI value acquired from the PCFICH are cross-checked, and, if the CFI value acquired from the PCFICH is 1 or 3, it may be judged that the CFI value acquired from the PCFICH has no error.

Figure 10:
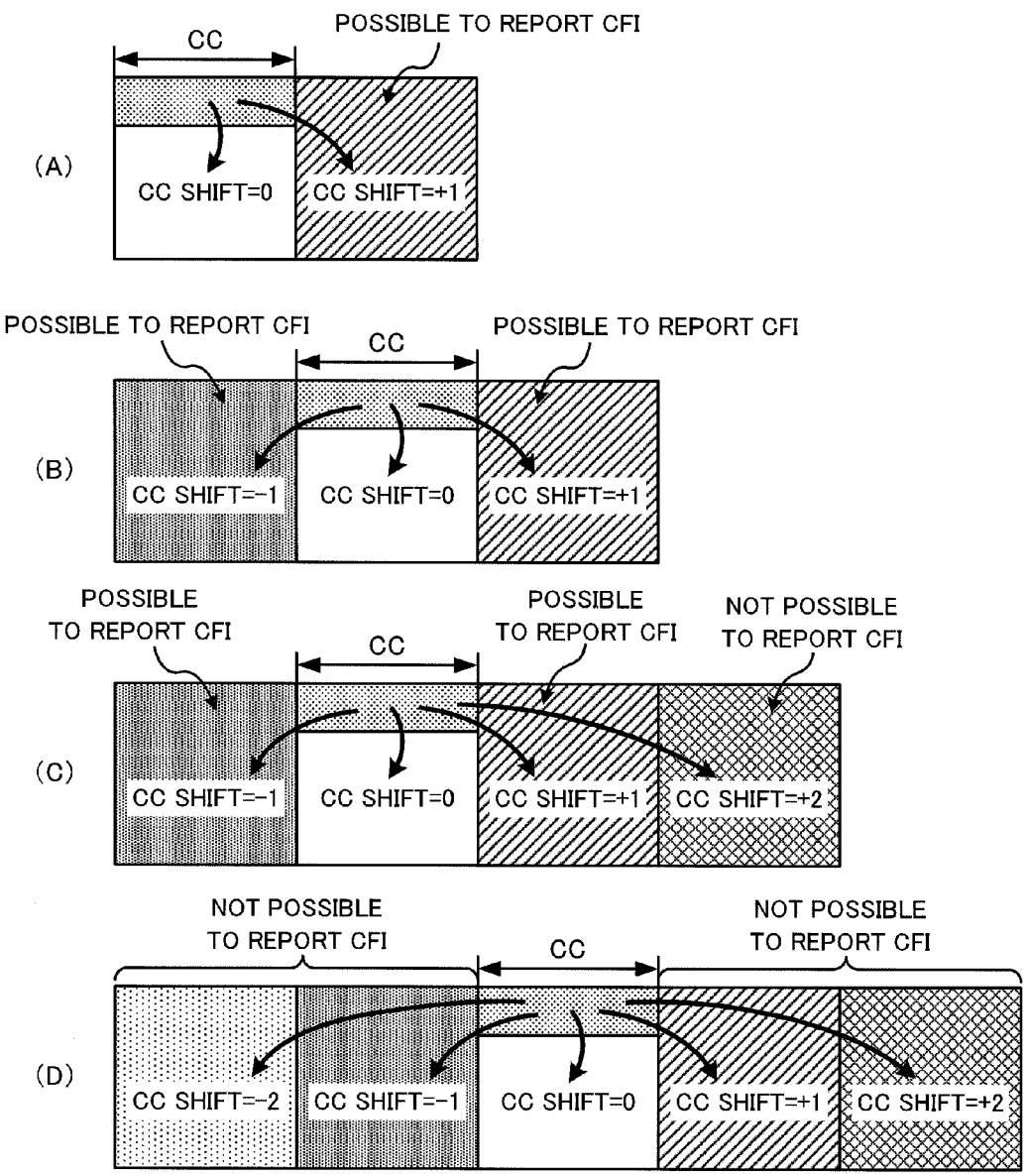
FIG. 10 provides drawings illustrating ranges where the CIF value can be reported.

FIG. 10 provides drawings illustrating component carriers by which it is possible or not possible to report the CFI value. According to the joint coding table illustrated in FIG. 9, whether or not the CFI value can be reported is determined. In the event of component carrier set 2, 3 or 4, in the range where the component carrier to transmit the PDSCH and the component carrier to transmit its PDCCH are adjacent with each other, it is possible to report the CFI value. When the component carrier set becomes 5, a case occurs where it is not possible to transmit the CFI value even if the component carriers are adjacent with each other.

Figure 11:
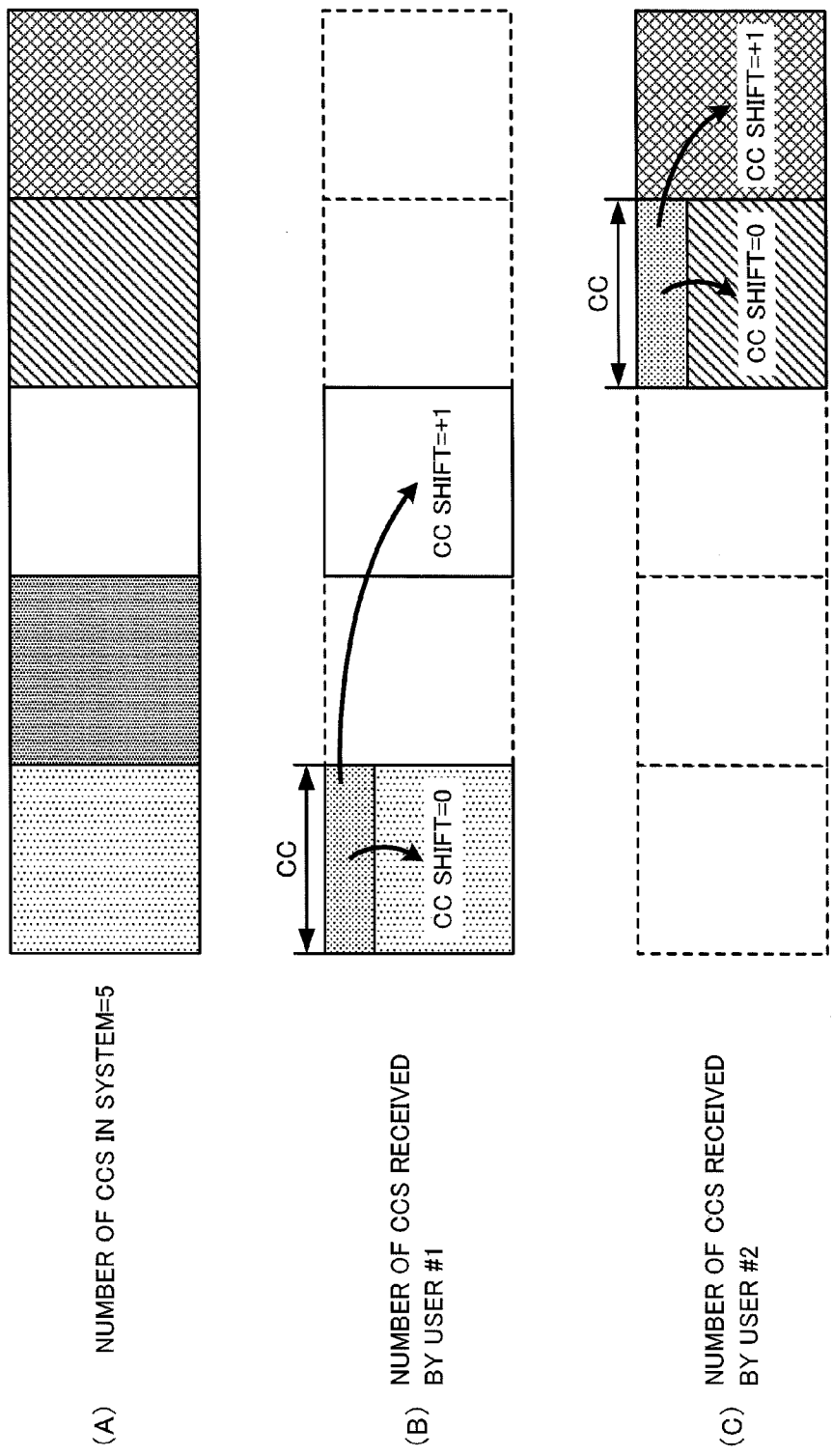
FIG. 11 provides drawings illustrating examples of amounts of shift when the component carriers to be defined by users vary.

"adjacent component carriers" in this specification refers not only to holding the relationship of arrangement in which two component carriers directly contact each other as illustrated in FIG. 10, and also covers the relationship of arrangement in which two component carriers are placed in locations that are apart along the frequency axis direction. If the order of arrangement of a plurality of component carriers is determined uniquely, two component carriers that are adjacent with each other in the order of arrangement can be considered as adjacent component carriers even when they are arranged in locations that are apart along the frequency axis direction. Also, component carriers to be defined might vary per user. To be more specific, as illustrated in FIG. 11(A), even when the number of CCs in the system is five, if users #1 and #2 are reported to receive mutually different CCs by upper layer signals as illustrated in FIGS. 11(B) and (C), in this example, the number of CCs operates being two for both users #1 and #2.

In this way, by fixing the number of bits of the carrier indicator field (CI), it is possible to reduce the processing load in the receiver. Also, until when the component carrier set is 4, it is possible to report the CFI value up to adjacent component carriers.

Now, embodiments of the present invention will be described below in detail with reference to the accompanying drawings. A case will be described here where a base station and mobile stations supporting an LTE-A system are used.

Figure 12:
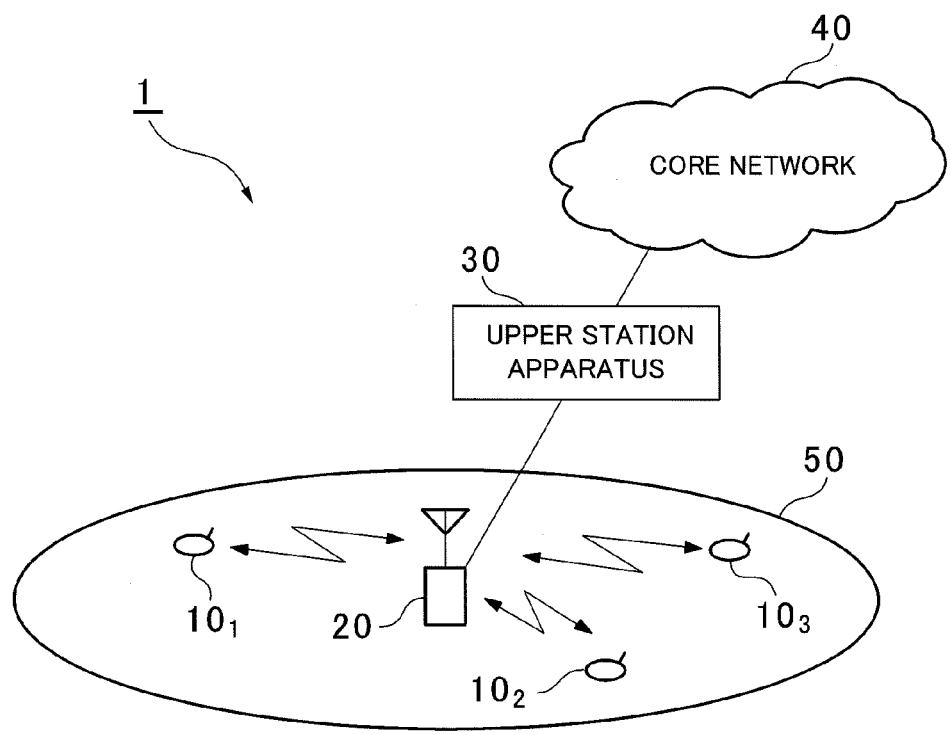
FIG. 12 is an overview of a mobile communication system according to an embodiment.

Referring to FIG. 12, a mobile communication system 1 having a mobile station (UE) 10 and a base station (Node B) 20 according to an embodiment of the present invention will be described. FIG. 12 is a drawing for explaining the configuration of the mobile communication system 1 having mobile stations (UE) 10 and base station (Node B) 20, according to the present embodiment. The mobile communication system 1 illustrated in FIG. 12 is a system to incorporate, for example, an LTE system or SUPER 3G. Also, this mobile communication system 1 may be referred to as "IMT-Advanced" or "4G."

As illustrated in FIG. 12, the mobile communication system 1 is configured to include a base station 20 and a plurality of mobile stations 10 ($10_1$, $10_2$, $10_3$, ... $10_n$, where n is an integer to satisfy n>0) that communicate with this base station 20. The base station 20 is connected with an upper station apparatus 30, and this upper station apparatus 30 is connected with a core network 40. The mobile stations 10 communicate with the base station 20 in a cell 50. The upper station apparatus 30 includes, for example, an access gateway apparatus, a radio network controller (RNC), a mobility management entity (MME) and so on, but is by no means limited to these.

The mobile stations ($10_1$, $10_2$, $10_3$, ... $10_n$) have the same configuration, functions and state, so that, the following description will be given with respect to "mobile station 10," unless specified otherwise. Also, although a mobile station 10 performs radio communication with the base station 20 for ease of explanation, more generally, user apparatuses (User Equipment) including mobile stations and fixed terminal apparatuses may be used.

In the mobile communication system 1, as radio access schemes, OFDMA is applied to the downlink and SC-FDMA is applied to the uplink. OFDMA is a multi-carrier transmission scheme of performing communication by dividing a frequency band into a plurality of narrow frequency bands (subcarriers) and mapping data to each subcarrier. SC-FDMA is a single carrier transmission scheme of reducing interference between terminals by dividing a system band into bands formed with one or continuous resource blocks, per terminal, and allowing a plurality of terminals to use mutually different bands.

Here, the communication channels in the LTE system will be described. On the downlink, a PDSCH that is used by each mobile station 10 on a shared basis, and downlink control channels (PDCCH, PCFICH and PHICH) are used. A downlink control channel may be referred to as a "downlink L1/L2 control channel." By means of the PDSCH, user data (including upper layer control signals), that is, normal data signals, is transmitted. Transmission data is included in this user data. Component carriers that are assigned to the mobile station 10 by the base station 20 may be reported to the mobile station 10 by RRC signaling.

On the uplink, a PUSCH that is used by each mobile station 10 on a shared basis and a PUCCH which is an uplink control channel, are used. User data is transmitted by means of this PUSCH. Furthermore, by means of the PUCCH, UL ACK/NACK, downlink radio quality information (CQI: Channel Quality Indicator) and so on, are transmitted.

Figure 13:
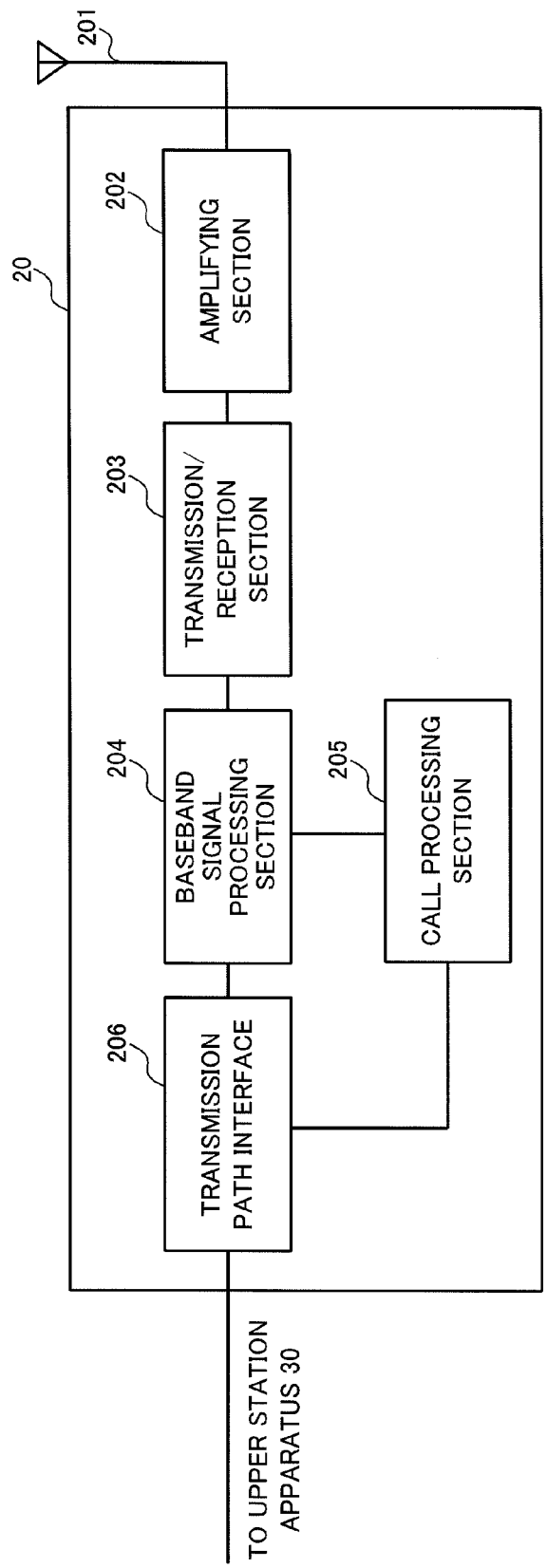
FIG. 13 is a schematic configuration diagram of a base station according to an embodiment.

FIG. 13 is a schematic configuration diagram of a base station 20 according to the present embodiment. The base station 20 has a transmission/reception antenna 201, an amplifying section 202, a transmission/reception section 203, a baseband signal processing section 204, a call processing section 205, and a transmission path interface 206.

User data that is transmitted on the downlink from the base station 20 to the mobile station 10 is input in the baseband signal processing section 204 through the transmission path interface 206, from the upper station apparatus 30, which is positioned above the base station 20

In the baseband signal processing section 204, PDCP layer processing such as assigning sequence numbers, division and coupling of user data, RLC (Radio Link Control) layer transmission processing such as RLC retransmission control transmission processing, and MAC (Medium Access Control) retransmission control, for example, HARQ transmission processing, scheduling, transport format selection, channel coding, inverse fast Fourier transform (IFFT) processing, and precoding processing are performed, and the result is transferred to the transmission/reception section 203. Furthermore, as with downlink control channel signals, transmission processing such as channel coding and inverse fast Fourier transform are performed, and the result is transferred to the transmission/reception section 203.

The baseband signal processing section 204 reports control information for communication in the cell 50, to the mobile station 10, by a broadcast channel. Broadcast information for communication in the cell 50 includes, for example, the system bandwidth on the uplink and the downlink, identification information of a root sequence (root sequence index) for generating signals of random access preambles of the PRACH, and so on.

In the transmission/reception section 203, the baseband signal output from the baseband signal processing section 204 is converted into a radio frequency band through frequency conversion processing, and, after that, amplified in the amplifying section 202 and transmitted from the transmission/reception antenna 201.

Meanwhile, the base station 20 receives the transmission wave transmitted from the mobile station 10 in the transmission/reception antenna 201. The radio frequency signal received in the transmission/reception antenna 201 is amplified in the amplifying section 202, subjected to frequency conversion and converted into a baseband signal in the transmission/reception section 203, and input to the baseband signal processing section 204.

The baseband signal processing section 204 performs FFT processing, IDFT processing, error correction decoding, MAC retransmission control reception processing, and RLC layer and PDCP layer reception processing of the user data included in the baseband signal that is received as input, and transfers the result to the upper station apparatus 30 through the transmission path interface 206.

The call processing section 205 performs call processing such as setting up and releasing a communication channel, manages the state of the base station 20 and manages the radio resources.

Figure 14:
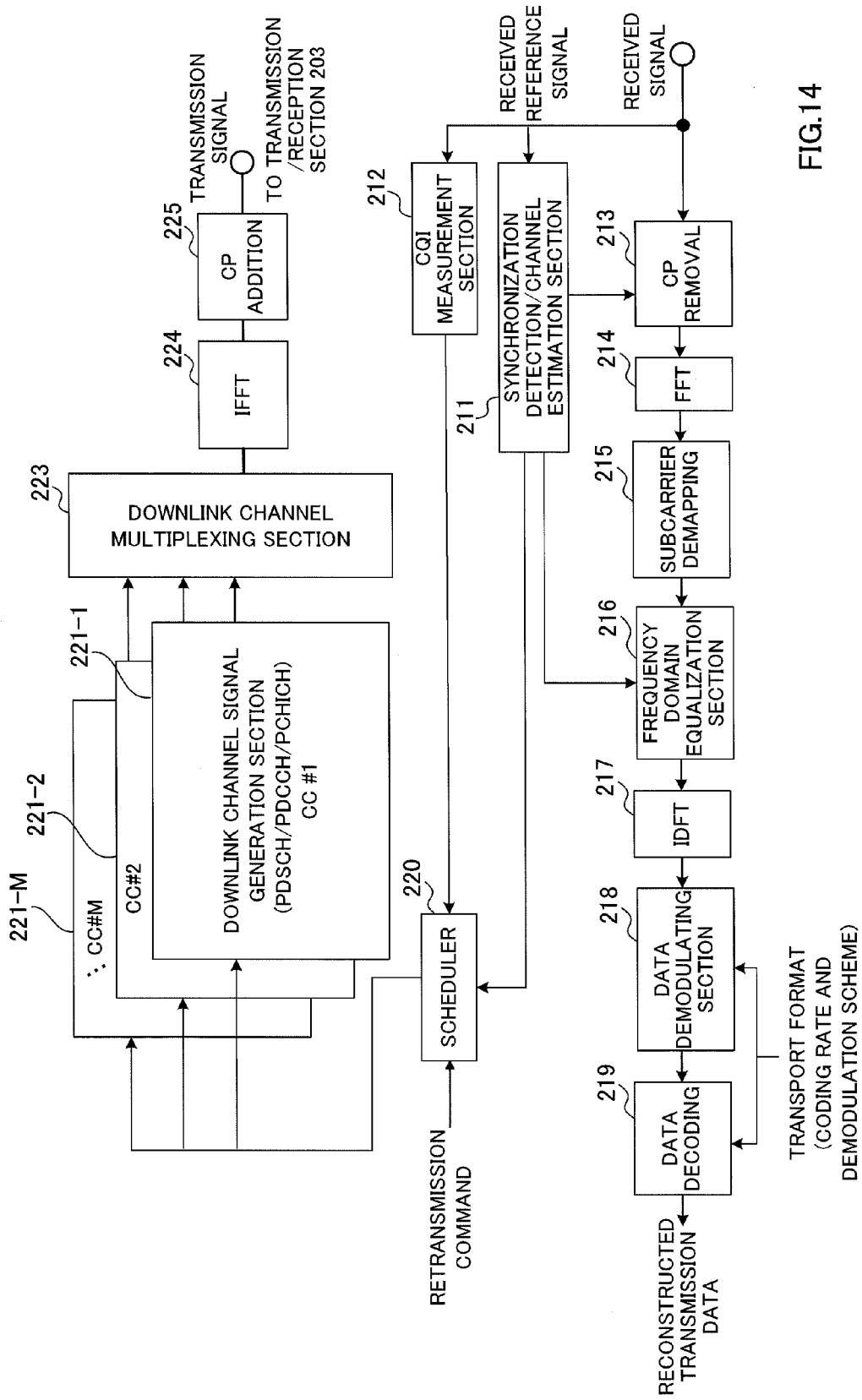
FIG. 14 is a functional block diagram of a baseband signal processing section provided in a base station according to an embodiment.
Figure 15:
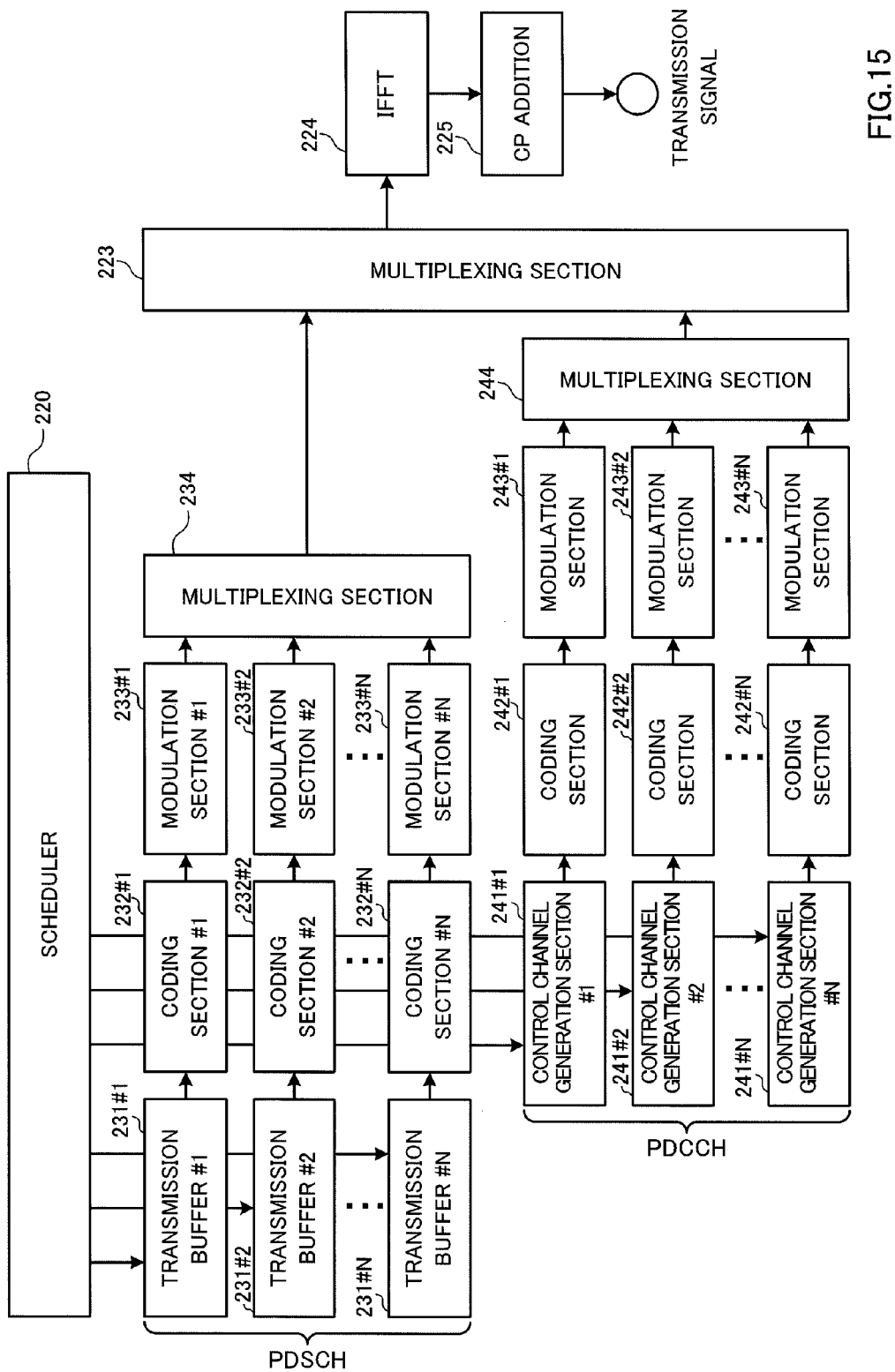
FIG. 15 is a functional block diagram of a transmission processing section in a baseband signal processing section of a base station according to an embodiment.

FIG. 14 is a functional block diagram illustrating the baseband signal processing section 204 provided in the base station 20 according to the present embodiment, and FIG. 15 illustrates the functional blocks of a transmission processing section in the baseband signal processing section 204 of the base station 20.

The reference signal included in a received signal is input in the synchronization detection/channel estimation section 211 and the CQI measurement section 212. The synchronization detection/channel estimation section 211 estimates the uplink channel state based on the reception condition of the reference signal received from the mobile station 10. The CQI measurement section 212 measures CQI from the reference signal for quality measurement, that is received from the mobile station 10.

Moreover, in the baseband signal processing section 204, after the cyclic prefix added to the received signal is removed by the CP removing section 213, the result is subjected to a Fourier transform in the fast Fourier transform section 214 and converted into frequency domain information. The received signal, converted in frequency domain information, is demapped in the frequency domain in the subcarrier demapping section 215. The subcarrier demapping section 215 performs demapping in a way to match the mapping in the mobile station 10. The frequency domain equalization section 216 equalizes the received signal based on the channel estimation value provided from the synchronization detection/channel estimation section 211. The inverse discrete Fourier transform section 217 performs an inverse discrete Fourier transform on the received signal and converts the frequency domain signal back to a time domain signal. Then, in the data demodulating section 218 and data decoding section 219, demodulation and decoding are performed based on the transport format (coding rate and modulation scheme), and transmission data is reconstructed.

Also, the channel estimation value estimated in the synchronization detection/channel estimation section 211 and the CQI of each resource block measured in the CQI measurement section 212 are input in the scheduler 220. The scheduler 220 schedules uplink/downlink control signals and uplink and downlink shared channel signals with reference to a retransmission command input from the upper station apparatus 30, channel estimation value and CQI. A propagation path in mobile communication varies differently per frequency, due to frequency selective fading. So, upon transmission of user data to a user terminal, adaptive frequency scheduling to assign resource blocks of good communication quality to each user terminal on a per subframe basis is used. In adaptive frequency scheduling, for each resource block, a user terminal of good propagation path quality is selected and assigned. Consequently, the scheduler 220 assigns resource blocks using the CQI of each resource block, fed back from each user terminal. Also, MCS (coding rate and modulation scheme) that fulfills a required block error rate with the assigned resource blocks is determined.

Here, upon starting communication or during communication, actively, one or a plurality of component carriers (CC #1 to CC #M) to use for communication with mobile stations are assigned. With the communication system of the present embodiment, maximum five component carriers can be assigned at the same time. The number of component carriers to be assigned to a mobile station can be determined based on conditions such as the capacity of the mobile station, the communication quality at present, the volume of data at present, and so on, and, for example, component carrier assignment information can be reported to the mobile station by RRC signaling.

The scheduler 220 manages the component carriers assigned to the user (mobile station 10). When a plurality of component carriers are assigned to one user, a PDSCH for transmitting data to that user is arranged for each assigned component carrier. Also, from the component carriers assigned to that user, the component carrier for transmitting the PDCCH corresponding to the PDSCH arranged for the component carrier, is selected. As a result, from the relative relationship of arrangement between the component carrier by which the PDSCH is transmitted and the component carrier by which the PDCCH corresponding to that PDSCH is transmitted, the value of a carrier indicator is determined. A carrier indicator may be designated from an upper layer to the scheduler 220.

For example, when two component carriers are assigned for communication with a user (FIG. 10(A)) and the PDCCH is transmitted by a component carrier that is adjacent to the component carrier that transmits the PDSCH, the amount of shift represented by the carrier indicator is +1.

A carrier indicator for specifying the component carrier assigned to the PDSCH corresponding to the PDCCH, and a CFI value for indicating the number of symbols assigned to the control channel region in the same subframe as the PDSCH, are supplied to control channel generation sections 241 #1 to 241 #N.

In downlink control signal scheduling, how many symbols from the beginning OFDM symbol in each subframe are assigned to the downlink control channel is determined. The scheduler 220 determines an optimal number of OFDM symbols according to the cell radius and the number of users accommodated. This CFI value is reported to control channel generation sections 241 #1 to 241 #N.

Furthermore, resources are allocated to the PDCCH, which is a downlink control channel, in CCE units. The scheduler 220 controls the number of CCEs to assign to users #1 to #N, and controls the coding rate. For users requiring high coding rates, such as users located in cell edges, the number of CCEs to assign is made large. Also, for users requiring low coding rates, such as users in the cell center, the number of CCEs to assign is made small.

The transmission processing system of the baseband signal processing section 204 is configured to be adaptable to M component carriers CC #1 to CC #M with this embodiment, and has M downlink channel signal generation sections 221-1 to 221-M in association with component carriers CC #1 to CC #M. Also, the transmission processing system of the baseband signal processing section 204 is configured to be able to accommodate maximum N users (user #1 to #N). Although FIG. 14 illustrates a PDSCH, PDCCH and PCFICH as downlink channels related to the present invention, other channels are actually included as well.

As illustrated in FIG. 15, the transmission processing system of the baseband signal processing section 204 has transmission buffers 231 #1 to 231 #N that store PDSCH transmission data on a temporary basis, coding sections 232 #1 to 232 #N that encode transmission data output from transmission buffers 231 #1 to 231 #N by predetermined coding methods, and modulation sections 233 #1 to 233 #N that modulate coded transmission data by predetermined modulation methods. The PDSCH transmission data is given from an upper layer. Information (MCS) about the coding method and modulation method for transmission data is reported from the scheduler 220. Signals to be transmitted by the PDSCH are generated for each of component carriers CC #1 to CC #M.

Also, the transmission processing system of the baseband signal processing section 204 has control channel generation sections 241 #1 to 241 #N that generate downlink control signals, coding sections 242 #1 to 242 #N that encode downlink control signals that are generated, and modulation sections 243 #1 to 243 #N that modulate coded downlink control signals. The control channel generation sections 241 #1 to 241 #N generate downlink control signals from the resource allocation information determined per user and reported from the scheduler 220, MCS information, information for HARQ, PUCCH transmission power control command and so on. For example, control channel generation section 241 #1 generates a downlink control signal (the field configuration is illustrated in FIG. 7(B)) to be transmitted by the PDCCH to user #1. Consequently, the carrier indicator (the component carrier assigned to the PDSCH corresponding to the PDCCH) reported from the scheduler 220, and the CFI value (which is determined by the scheduling of the PDCCH) are subjected to joint coding with reference to the joint coding table illustrated in FIG. 8 or FIG. 9. For example, a case will be described as an example where, in the event the joint coding table illustrated in FIG. 9 is adopted, the number of carriers to constitute a component carrier set is three (FIG. 10(B)). If the amount of shift is +1 and the CFI value is 3 at this time, "011" is given by coding. Also, in the event the number of carriers to constitute a component carrier set is four (FIG. 10(C)), if the amount of shift is +1 and the CFI value is 3, "011" is given likewise by coding. In this way, with reference to the joint coding table illustrated in FIG. 8 or FIG. 9, the carrier indicator of the component carrier assigned to the PDSCH, and the CFI value, which is the time resource allocated to the PDCCH for that PDSCH, are subjected to joint coding. Control channel generation section 241 #1 sets the coded data given by the above joint coding in the carrier indicator field illustrated in FIG. 7(B). For each of component carriers CC #1 to CC #M, downlink control information to be reported by the PDCCH is generated, in each downlink control information coded data given by joint coding of the carrier indicator and the CFI value are set.

Transmission data to be transmitted by the PDSCH is generated per component carrier, in parallel in user units, and multiplexed in the multiplexing section 234. Also, downlink control to be transmitted by the PDCCH is generated per component carrier, in parallel in user units, and multiplexed in the multiplexing section 244. The downlink channel multiplexing section 223 multiplexes the channel signals respectively output from the multiplexing sections 234 and 244 for component carriers CC #1 to CC #M (where time, frequency domain and code multiplexing may be used).

A downlink channel signal that is multiplexed in the downlink channel multiplexing section 223 is subjected to an inverse fast Fourier transform in the inverse fast Fourier transform section 224 and converted from a frequency domain signal into a time sequence signal, and then added a cyclic prefix in the cyclic prefix adding section (CP adding section) 225. Note that a cyclic prefix functions as a guard interval for cancelling the differences in multipath propagation delay. The transmission data to which the cyclic prefix is added, is transmitted to the transmission/reception section 203.

Figure 16:
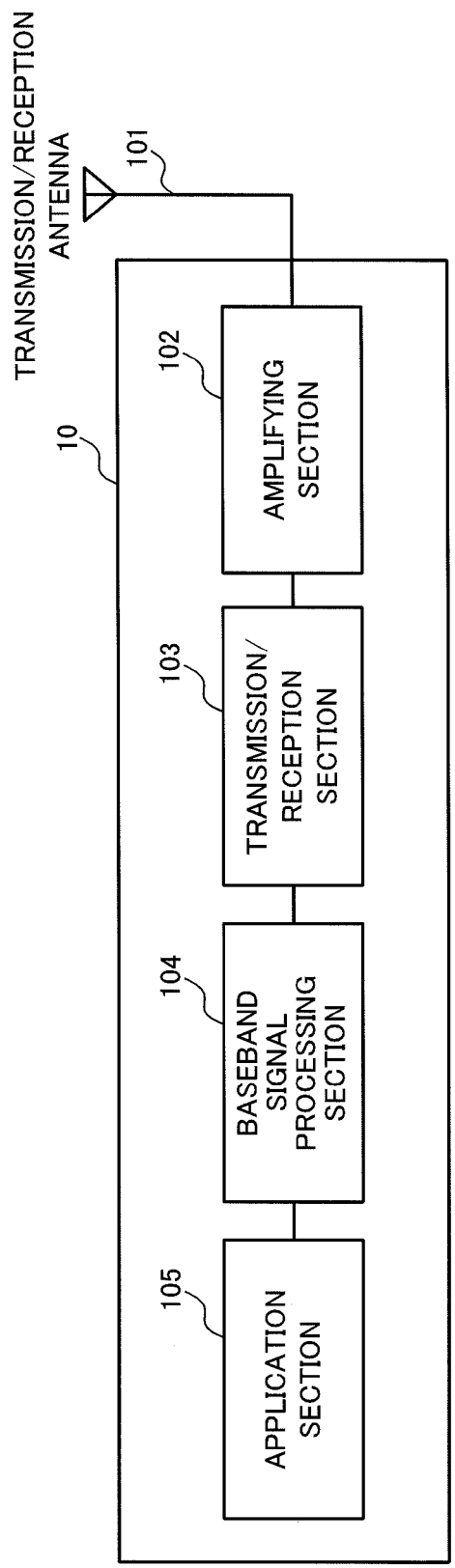
FIG. 16 is a schematic configuration diagram of a mobile station according to an embodiment.

FIG. 16 is a schematic configuration diagram of the mobile station 10 according to the present embodiment. The mobile station 10 has a transmission/reception antenna 101, an amplifying section 102, a transmission/reception section 103, a baseband signal processing section 104, and an application section 105. When a signal is received, a radio frequency signal received in the transmission/reception antenna 101 is amplified in the amplifying section 102 and then converted into a baseband signal through frequency conversion in the transmission/reception section 103. This baseband signal is subjected to FFT processing, error correction decoding, retransmission control reception processing and so on in the baseband signal processing section 104. In this downlink data, downlink user data is transferred to the application section 105. The application section 105 performs processing related to upper layers above the physical layer and the MAC layer. Also, in the downlink data, broadcast information is also transferred to the application section 105. On the other hand, upon transmission, uplink user data is input from the application section 105 to the baseband signal processing section 104. In the baseband signal processing section 104, retransmission control (HARQ (Hybrid ARQ)) transmission processing, channel coding, DFT processing, IFFT processing and so on are performed, and the result is transferred to the transmission/reception section 103. The baseband signal output from the baseband signal processing section 104 is subjected to frequency conversion processing in the transmission/reception section 103 and converted into a radio frequency band, and, after that, amplified in the amplifying section 102 and transmitted from the transmission/reception antenna 101.

Figure 17:
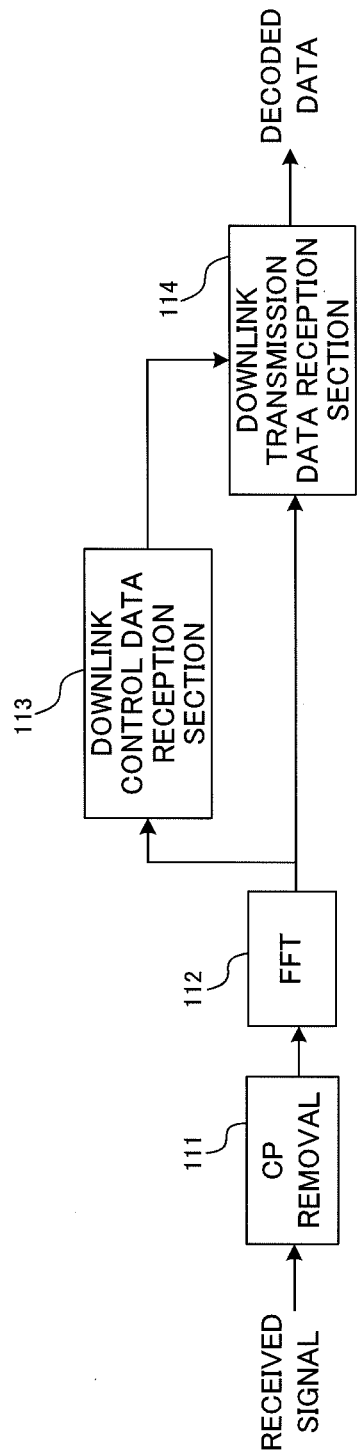
FIG. 17 is a functional block diagram of a baseband signal processing section provided in a mobile station according to an embodiment.

FIG. 17 is a functional block diagram of the baseband signal processing section 104 provided in the mobile station 10 according to the present embodiment, and illustrates a reception processing system. A received signal that is output from the transmission/reception section 103 is input in a CP removal section 111. In the CP removal section 111, the cyclic prefix, which is a guard interval, is removed from the received signal. The received signal (OFDM signal), from which the cyclic prefix is removed, is subjected to a fast Fourier transform in a fast Fourier transform section (FFT) 112, and converted from a time-component waveform into a frequency-component orthogonal multicarrier signal. In a downlink control data reception section 113, a downlink control channel signal is demodulated. In the downlink transmission data reception section 114, a downlink shared channel signal is demodulated based on the downlink control signal of the PDCCH.

Assume that the mobile station 10 is capable of communication using a system band formed with a plurality of component carriers. With respect to all received component carriers, the downlink control data reception section 113 decodes the PCFICH in subcarrier units and blind-decodes the PDCCH. In the PDCCH, the CRC code attached to the DCI is masked using the user identifier (UE-ID). In the downlink control data reception section 113, the masking of the CRC code is undone using the user identifier (UE-ID), to check whether or not the DCI has been transmitted by the CRC code without error. As a result, if it is confirmed that there is no error with the DCI, this means that the PDCCH has been received without error. If the PDCCH has been received without error, this then means that the CFI value, which is acquired from the carrier indicator field transmitted by the same carrier component as for the PDCCH, has also been received without error.

The DCI structure demodulated from the PDCCH that is received without error, a carrier indicator field is included. The carrier indicator is extracted from the carrier indicator field of the DCI, and, with reference to the joint coding table illustrated in FIG. 8 or FIG. 9, the carrier indicator and the CFI value are decoded. The joint coding table is reported from the base station 20 to the mobile station 10 in advance. The joint coding table can be reported by RRC signaling, but other reporting methods may be adopted as well. By using the same table as the joint coding table used for the joint coding of a carrier indicator and a CFI value in the base station 20, it is able to decode the carrier indicator and the CFI value. The downlink control data reception section 113 cross-checks the CFI value decoded from the PCFICH and the CFI value decoded from the carrier indicator field. When the both values match, the PDSCH is decoded using this CFI value. On the other hand, when the both values do not match, it is preferable to decode the PDSCH using the CFI value decoded from the carrier indicator field, because, with this carrier indicator field, it has been confirmed that there is no DCI error, by the CRC code. Also, in the event of component carrier set 5 in the joint coding table illustrated in FIG. 9, although the case where the CFI value is 1 or 3 is included, in this case, if there is a value to match the CFI value given by decoding the PCFICH, using that value as the CFI value, the PDSCH may be decoded. When the CFI value is 2, there is definitely a PCFICH error, and so either the CFI value=1 or 3 decoded from the carrier indicator, may be selected.

The downlink transmission data reception section 114 specifies the original carrier component based on the carrier indicator acquired in the downlink control data reception section 113, detects the starting position of the corresponding PDSCH from the specified carrier component, based on the CFI value, and starts acquiring user data from the starting position of the PDSCH.

Whether or not each packet constituting the downlink shared channel (PDSCH) has an error is determined, and the determined results are output as UL ACK/NACK. UL ACK/NACK is reported to the base station 20 using the PUCCH or PUSCH.

The present invention is by no means limited to the above embodiment and can be implemented in various modifications within the spirit of the present invention. For example, although FIG. 9 illustrates a joint coding table fixed with three bits as an example, it is equally possible to use a joint coding table fixed with four bits, as illustrated in FIG. 18 and FIG. 19.

The joint coding table illustrated in FIG. 18 is configured such that the CFI value can be reported in cases other than a case where CC shift=0. By using the joint coding table illustrated in FIG. 18, it is possible to report the CFI value with respect to all shift amounts, even when the component carrier set is 5.

The joint coding table illustrated in FIG. 19 is configured such that the CFI value can be reported, including the case the amount of shift is CC shift=0. That is to say, even when CC shift=0, all of the CFI values 1, 2 and 3 can be reported via the DCI structure. When data is transmitted from a plurality of base stations simultaneously, cases might occur where the CFI cannot be transmitted even from places where the amount of shift is CC shift=0. Taking that case into account, a table configuration is provided whereby the CFI can be reported even when CC shift=0. By using the joint coding table illustrated in FIG. 19, even in places where the amount of shift is CC shift=0, it is possible to include data given by joint-encoding the carrier indicator and CFI value in the DCI configuration, and report an error-free CFI value.

FIG. 20 illustrates an example of modification of a joint coding table fixed with three bits. As for component carrier set 2, even if CC shift=0, all of the CFI values 1, 2 and 3 can be reported, and, as for component carrier set 3, even if CC shift=0, the CFI values 2 and 3 can be reported. By using the joint coding table illustrated in FIG. 20, it is possible to keep the fixed number of bits for the carrier indicator field at three and report the CFI value even in places where the amount of shift is CC shift=0.

FIG. 21 illustrates an example of a configuration of a joint coding table fixed with two bits. In the event of fixing with two bits, although the CFI value cannot be reported in part of component carrier set=3 and in component carrier sets=4 and 5, it is possible to reduce the number of bits.

INDUSTRIAL APPLICABILITY

The present invention is applicable to PCFICH error detection in an LTE/LTE system.

The disclosure of Japanese Patent Application No. 2009-252405, filed on Nov. 2, 2009, including the specification, drawings and abstract, is incorporated herein by reference in its entirety.

The invention claimed is:

1. A radio communication apparatus comprising:
a coding section configured to jointly code a carrier indicator of a basic frequency block assigned to a downlink shared channel signal and time resource data assigned to a downlink control channel signal corresponding to the downlink shared channel signal;
a control channel signal generation section configured to generate a downlink control signal including the coded carrier indicator as the downlink control channel signal corresponding to the downlink shared channel signal; and
a transmission section configured to transmit the generated downlink control channel signal by a basic frequency block assigned to the downlink control channel signal, wherein the coding section comprises a coding table in which the carrier indicator is defined by an amount of shift from the basic frequency block assigned to the downlink control channel signal to the basic frequency block assigned to the downlink shared channel signal, and
the time resource data of the downlink control channel signal is defined by the number of symbols, (x, y), x being the amount of shift and Y being the number of symbols, is determined for each basic frequency block set aggregating basic frequency blocks, and a same code is assigned to (x, y) that is common between basic frequency block sets.

2. The radio communication apparatus according to claim 1, wherein the carrier indicator represents a relative positional relationship between the basic frequency block assigned to the downlink shared channel signal and the basic frequency block assigned to the downlink control channel signal corresponding to the downlink shared channel signal.

3. The radio communication apparatus according to claim 1, wherein, in the coding table, the number of basic frequency blocks to constitute each basic frequency block set is 2, 3, 4 or 5, and codes for all (x, y) are fixed to three bits.

4. The radio communication apparatus according to claim 2, wherein, in the coding table, up to when the number of basic frequency blocks to constitute each basic frequency block set is 2, 3 or 4, (x, y) is set so that y represents one of the number of symbols corresponding x which represents the amount of shift to an adjacent basic frequency.

5. A radio communication apparatus comprising:
a reception section configured to receive a plurality of basic frequency blocks;
a downlink control data reception section configured to decode a downlink control channel signal from the received basic frequency blocks and extracts a carrier indicator, and
decode time resource data that is joint-coded with the carrier indicator; and a downlink transmission data reception section configured to, from a received basic frequency block designated by the carrier indicator, decode a downlink shared channel signal corresponding to the downlink control channel signal using the downlink control channel signal and the time resource data, wherein the coding section comprises a coding table in which the carrier indicator is defined by an amount of shift from the basic frequency block assigned to the downlink control channel signal to the basic frequency block assigned to the downlink shared channel signal, and
the time resource data of the downlink control channel signal is defined by the number of symbols, (x, y), x being the amount of shift and Y being the number of symbols, is determined for each basic frequency block set aggregating basic frequency blocks, and a same code is assigned to (x, y) that is common between basic frequency block sets.

6. The radio communication apparatus according to claim 5, wherein the downlink control data reception section is configured to decode the time resource data that is joint-coded with the carrier indicator, using a same coding table as a coding table that is used in a transmitter for joint coding of the carrier indicator and the time resource data.

7. A radio communication control method comprising:
jointly coding a carrier indicator of a basic frequency block assigned to a downlink shared channel signal and time resource data assigned to a downlink control channel signal corresponding to the downlink shared channel signal;
generating a downlink control signal including the coded carrier indicator as the downlink control channel signal corresponding to the downlink shared channel signal; and
transmitting the generated downlink control channel signal by a basic frequency block assigned to the downlink control channel signal, wherein the coding section comprises a coding table in which the carrier indicator is defined by an amount of shift from the basic frequency block assigned to the downlink control channel signal to the basic frequency block assigned to the downlink shared channel signal, and
the time resource data of the downlink control channel signal is defined by the number of symbols, (x, y), x being the amount of shift and Y being the number of symbols, is determined for each basic frequency block set aggregating basic frequency blocks, and a same code is assigned to (x, y) that is common between basic frequency block sets.

8. A radio communication control method comprising:
receiving a plurality of basic frequency blocks;
decoding a downlink control channel signal from the received basic frequency blocks and extracting a carrier indicator, and decoding time resource data that is joint-coded with the carrier indicator; and
decoding, from a received basic frequency block designated by the carrier indicator, a downlink shared channel signal corresponding to the downlink control channel signal using the downlink control channel signal and the time resource data, wherein the coding section comprises a coding table in which the carrier indicator is defined by an amount of shift from the basic frequency block assigned to the downlink control channel signal to the basic frequency block assigned to the downlink shared channel signal, and
the time resource data of the downlink control channel signal is defined by the number of symbols, (x, y), x being the amount of shift and Y being the number of symbols, is determined for each basic frequency block set aggregating basic frequency blocks, and a same code is assigned to (x, y) that is common between basic frequency block sets.

* * * * *